Nov. 20, 1956     A. W. PEARCE     2,770,985
CHAIN SAW SHARPENER
Filed Feb. 11, 1955
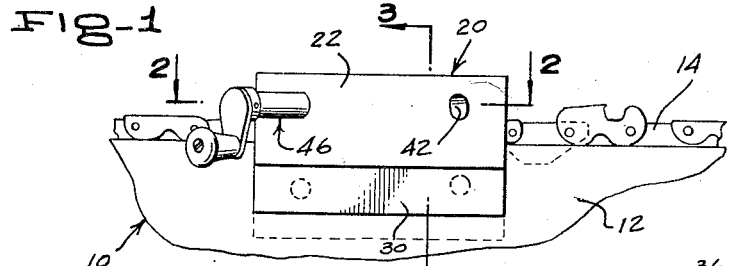
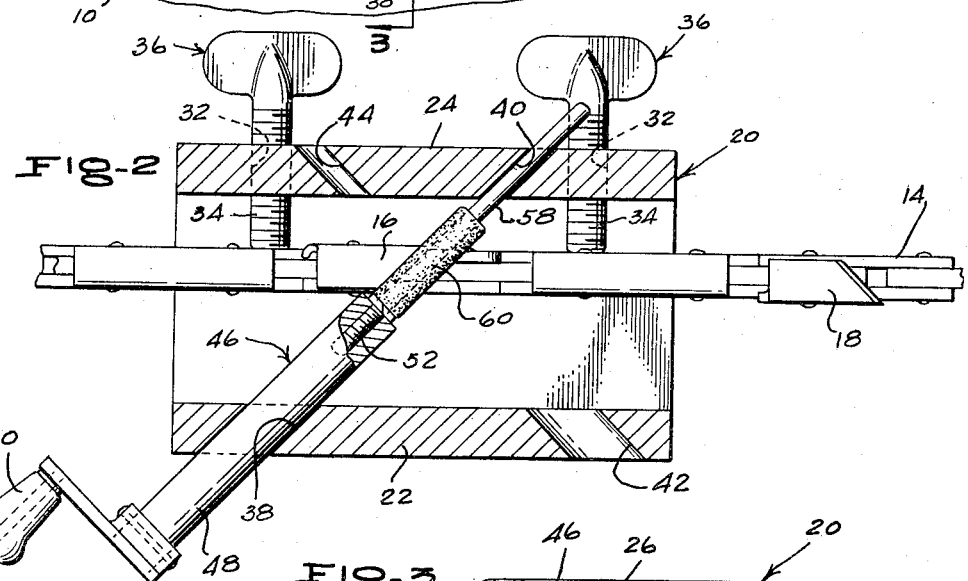
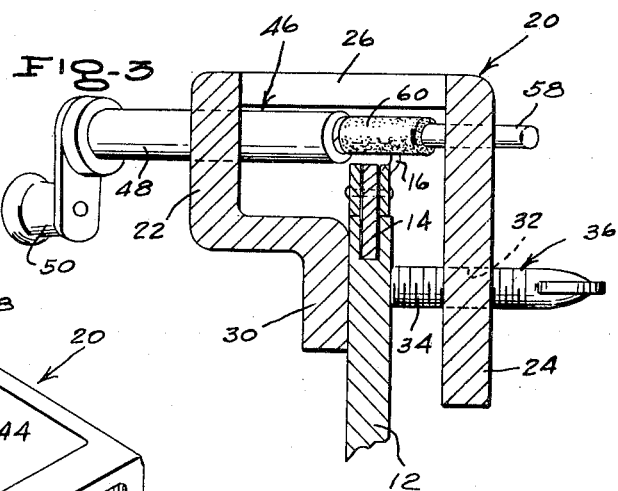
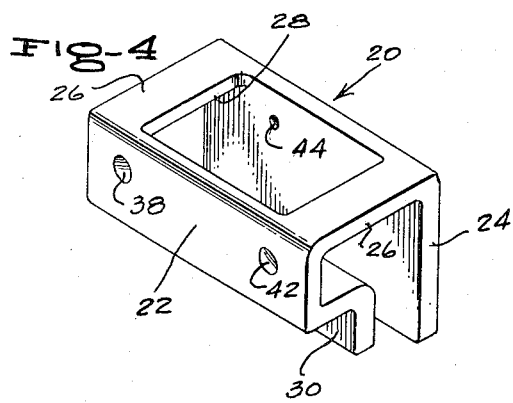
INVENTOR.
ARTHUR W. PEARCE
BY
McMorrow, Berman + Davidson
ATTORNEYS 0# United States Patent Office 2,770,985
Patented Nov. 20, 1956

2,770,985
CHAIN SAW SHARPENER
Arthur W. Pearce, Libby, Mont.
Application February 11, 1955, Serial No. 487,599
2 Claims. (Cl. 76—37)

This invention relates to an improved chain saw sharpener.

An object of the invention is to facilitate the rapid mounting and demounting of the saw sharpener on a chain saw in such a position that the teeth of the saw may be brought into contact with the abrasive portion of the saw sharpening implement.

The above and other objects may be attained by employing this invention which embodies among its features a pair of parallel guides having aligned guide openings extending therethrough, means carried by the guides and extending outwardly therefrom for engaging a saw blade and removably connecting the guides thereto, and an abrading implement removably mounted in the guide openings for movement between the guides against a saw tooth carried by the saw blade for sharpening said saw tooth.

Other features include aligned pairs of guide openings extending through the guides along oppositely inclined diagonal axes, means carried by the guides and extending outwardly therefrom for engaging a saw blade and removably connecting the guides thereto, a shaft removably mounted in selected aligned guide openings for rotation about its longitudinal axis, a cylindrical body of abrasive material carried by the shaft intermediate the ends thereof for rotation thereby in contact with a saw tooth, and a hand crank carried by the shaft and extending laterally outwardly therefrom adjacent one end thereof for rotating said shaft.

In the drawings:

Figure 1 is a fragmentary side view of a chain saw blade showing an improved saw sharpener in accordance with the present invention mounted in place thereon;

Figure 2 is an enlarged fragmentary sectional view taken substantially on the line 2—2 of Figure 1;

Figure 3 is a fragmentary enlarged sectional view taken substantially on the line 3—3 of Figure 1; and Figure 4 is a perspective view of the frame of the sharpener.

Referring to the drawings in detail, a chain saw designated generally 10 comprises a conventional chain guide 12 on which a chain 14 is mounted to run, which chain carries outwardly extending saw teeth 16 and 18.

The illustrated sharpener comprises a substantially channel-shaped frame 20 composed of spaced parallel side walls 22 and 24, serving as guides, which are connected together by a web 26 which is apertured to provide a sight opening 28 through which saw teeth are visible during the sharpening thereof. A laterally inwardly offset jaw 30 is carried by the guide 22. Extending through the guide 24 adjacent opposite ends thereof and opposite the jaw 30 are internally screw threaded openings 32 which threadedly receive the shanks 34 of thumb screws designated generally 36, the ends of which are arranged to impinge on a chain saw guide 12, as illustrated in Figure 3, and clampingly engage the guide 12 against the jaw 30 and hold the frame 20 in place on the guide 12. Extending diagonally through the guide plates 22 and 24 are aligned bores 38 and 40, and similar bores 42 and 44 extend through the respective guides 22 and 24, along a diagonal axis which is perpendicular to the axis of the bores 38 and 40.

Removably and rotatably engaged in either the bore 38 or the bore 42 is an abrading implement designated generally 46 which comprises a shaft 48 of a diameter that will enable it to enter the openings 38 or 42 and rotate therein, as will be readily understood upon reference to Figure 2. A hand crank 50 is carried by the shaft 48 and extends outwardly adjacent one end thereof for imparting rotation thereto. Entering the end of the shaft 48 remote from the hand crank 50 is an internally screw threaded opening 52 in which a bearing rod 54 is threadedly engaged. This bearing rod is of a diameter to be received in one or the other of the smaller openings 40 and 44 of the guide 24 so as to support the abrading implement in a selected position in the guides. A cylindrical abrading body 60 is carried by the rod 58 adjacent its junction with the shaft 48 and in such a position that when the abrading implement 46 is in proper position between the guides 22 and 24, the cylindrical body 60 of abrading material will lie in the path of movement of a saw tooth carried by the saw guide plate 12.

In use, it will be evident that when a saw tooth 16 is to be sharpened, the abrading implement is mounted in the frame 20, as illustrated in Figure 2, so that upon rotating the hand crank 50, the shaft 48 will be rotated to cause the abrasive cylinder 60 to contact the saw tooth 16 and sharpen it. When it is desired to sharpen a tooth 18 of the chain saw, the abrading implement 46 is thrust through the bores 42 and 44 so as to lie along an axis which lies perpendicular to the axis which extends through the bores 38 and 40 and diagonal to the guides 22 and 24. With the implement 46 thus mounted in the frame 20, rotation of the hand crank 50 will cause the abrading cylinder 60 to rotate against the tooth 18 to sharpen it. Obviously, the progress of the work may be observed through the sight opening 28 and by the simple rotation of the implement 46 in selected aligned openings in the guides 22 and 24, the saw may be easily and quickly sharpened with but a minimum of effort.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a chain saw sharpener, a channel-shaped frame comprising a web and first and second side walls serving as guides, said guides having free edges remote from the web, a first pair of aligned bores in the guides arranged diagonally with respect to the length of the frame, a second pair of aligned bores in said guides disposed at right angles to the first pair of bores, said pairs of bores being positioned between the web and the free edges of the guides, a jaw on said first guide between the bores and the free edge of the first jaw, a screw threaded through the second guide opposite said jaw, and a rotary abrading implement journaled in a selected one of the pairs of bores carrying an abrading cylinder between the guides.

2. In a chain saw sharpener, a channel-shaped frame comprising a web and first and second side walls serving as guides, said guides having free edges remote from the web, a first pair of aligned bores in the guides arranged diagonally with respect to the length of the frame, a second pair of aligned bores in said guides disposed at right angles to the first pair of bores, said pairs of bores being positioned between the web and the free edges of the guides, a jaw on said first guide between the bores and the free edge of the first jaw, a screw threaded through the second guide opposite said jaw, and a rotary abrading implement journaled in a selected one of the pairs of bores carrying an abrading cylinder between the guides, each pair of bores consisting of a relatively large diameter bore and a relatively small diameter bore, said abrading implement comprising a shaft journaled in a large diameter bore and having outer and inner ends, a bearing rod journaled in a small diameter bore and having inner and outer ends, the inner end of the bearing rod being threaded into the inner end of said shaft, said abrading cylinder being fixed on said bearing rod.

References Cited in the file of this patent
UNITED STATES PATENTS

| | | |
|---|---|---|
| 1,475,351 | Phillips | Nov. 27, 1923 |
| 2,440,633 | Hall | Apr. 27, 1948 |
| 2,677,289 | Fitch | May 4, 1954 |
| 2,701,975 | Evanoff | Feb. 15, 1955 |